US012798923B2

(12) United States Patent
Lee et al.

(10) Patent No.: US 12,798,923 B2
(45) Date of Patent: Nov. 17, 2026

(54) DUPLEX WINDOW AND WINDOW SYSTEM INCLUDING SAME

(71) Applicants: Hyundai Motor Company, Seoul (KR); Kia Corporation, Seoul (KR); Base and Power City Corp., Seoul (KR)

(72) Inventors: Donguk Lee, Seoul (KR); Sungsu Park, Seoul (KR)

(73) Assignees: Hyundai Motor Company, Seoul (KR); Kia Corporation, Seoul (KR); BASE AND POWER CITY Corp., Seoul (KR)

( * ) Notice: Subject to any disclaimer, the term of this patent is extended or adjusted under 35 U.S.C. 154(b) by 238 days.

(21) Appl. No.: 18/464,601

(22) Filed: Sep. 11, 2023

(65) Prior Publication Data

US 2024/0110435 A1 Apr. 4, 2024

Related U.S. Application Data

(60) Provisional application No. 63/411,129, filed on Sep. 29, 2022.

(51) Int. Cl.
*B66B 11/02* (2006.01)
*B66B 1/34* (2006.01)
(Continued)

(52) U.S. Cl.
CPC ........ *B66B 11/0226* (2013.01); *B66B 1/3461* (2013.01); *B66B 1/425* (2013.01);
(Continued)

(58) Field of Classification Search
CPC ... B66B 11/0226; B66B 1/3461; B66B 1/425; B66B 3/002; B66B 11/0213;
(Continued)

(56) References Cited

U.S. PATENT DOCUMENTS 4,942,704 A * 7/1990 King ........................ E06B 3/677 52/204.593
5,110,337 A * 5/1992 Lisec .................... E06B 3/6775 65/270
(Continued)

FOREIGN PATENT DOCUMENTS

DE 102011118428 A1 * 5/2013 ............. E06B 3/677
JP 2004123402 A 4/2004
(Continued)

*Primary Examiner* — Omar F Hijaz
(74) *Attorney, Agent, or Firm* — Slater Matsil, LLP

(57) ABSTRACT

An embodiment window includes a first transparent plate, a second transparent plate spaced apart from the first transparent plate, a spacer located between an outer edge portion of the first transparent plate and an outer edge portion of the second transparent plate to space the first transparent plate and the second transparent plate apart from each other, a gas duct configured to allow a gas space to communicate with a region outside the window, wherein the gas space is defined by the first transparent plate, the second transparent plate, and the spacer, and a gas managing device comprising a gas injection part connected to the gas duct and configured to inject a gas into the gas space.

20 Claims, 3 Drawing Sheets

(51) Int. Cl.
*B66B 1/42* (2006.01)
*B66B 3/00* (2006.01)

(52) U.S. Cl.
CPC .......... *B66B 3/002* (2013.01); *B66B 11/0213* (2013.01); *B66B 2201/306* (2013.01)

(58) Field of Classification Search
CPC ........... B66B 2201/306; B66B 11/0045; E06B 1/325; E06B 3/263; E06B 1/528
See application file for complete search history.

(56) References Cited

U.S. PATENT DOCUMENTS 5,676,736 A * 10/1997 Crozel .................. E06B 3/6775 95/55
5,864,989 A * 2/1999 Funatsu .................... E06B 3/40 49/31
8,112,860 B2 * 2/2012 Collins ................... E06B 3/677 52/786.13
10,584,891 B2 3/2020 Park
2005/0166495 A1 * 8/2005 Cho .......................... E06B 7/12 52/204.5
2010/0287851 A1 * 11/2010 Kindschuh .............. E06B 3/677 52/204.6
2016/0348419 A1 * 12/2016 McHugh ............... E06B 3/6775
2019/0360712 A1 11/2019 Park

FOREIGN PATENT DOCUMENTS

JP 2015036354 A * 2/2015
KR 100869671 B1 11/2008
KR 101346263 B1 1/2014
KR 101835320 B1 3/2018
KR 102131258 B1 7/2020
KR 102160102 B1 9/2020
KR 102274366 B1 7/2021

* cited by examiner

DUPLEX WINDOW AND WINDOW SYSTEM INCLUDING SAME

CROSS-REFERENCE TO RELATED APPLICATIONS

This application claims the benefit of U.S. Provisional Application No. 63/411,129, filed on Sep. 29, 2022, which application is hereby incorporated herein by reference.

TECHNICAL FIELD

Exemplary embodiments relate to a duplex window and a window system including the same.

BACKGROUND

Duplex windows are formed by overlapping transparent plates together, rather than a single integrated window. When a window includes the duplex window and a heat insulating layer is formed between the plurality of transparent plates, a high heat insulating effect may be achieved. The heat insulating layer is filled with an inert gas, such as argon, to increase the heat insulating effect, and thus, the heat insulating effect may be maintained for a long period of time without changing compositions of materials.

However, the gas filling a space defined by the two transparent plates spaced apart from each other to form the heat insulating layer may be reduced over time via minute gaps formed between the transparent plates or due to permeation into materials. As the amount of a heat insulating gas filling the duplex window to form the heat insulation layer is reduced, the heat insulating effect of the duplex window may be deteriorated.

Meanwhile, it is difficult for robots used in real life to recognize architectural glass, which is one of the main building materials constituting an urban environment. A surface of the glass reflects and refracts light, and thus, it is difficult for the robots to recognize the glass located at a certain position.

SUMMARY

Exemplary embodiments of the present invention provide a duplex window easily recognized by a robot and a window system including same.

A first exemplary embodiment of the present invention provides a window including a first transparent plate, a second transparent plate spaced apart from the first transparent plate, a spacer located between an outer edge portion of the first transparent plate and an outer edge portion of the second transparent plate so that the first transparent plate and the second transparent plate are spaced apart from each other, a gas duct allowing a gas space, which is surrounded by the first transparent plate, the second transparent plate, and the spacer, to communicate with the outside, and a gas managing unit including a gas injection part that is connected to the gas duct to inject a gas into the gas space.

A second exemplary embodiment of the present invention provides a window system including a robot including a robot infrared sensor and a window, wherein the window includes a pair of transparent plates, a spacer located between outer edge portions of the pair of transparent plates so that the pair of transparent plates are spaced apart from each other, a gas duct allowing a gas space, which is surrounded by the pair of transparent plates and the spacer, to communicate with the outside, and a gas managing unit connected to the gas duct to inject a gas, which is detectable by the robot infrared sensor, into the gas space.

BRIEF DESCRIPTION OF THE DRAWINGS

The accompanying drawings, which are included to provide a further understanding of embodiments of the invention and are incorporated in and constitute a part of this specification, illustrate exemplary embodiments of the invention, and together with the description serve to explain the principles of embodiments of the invention.

DETAILED DESCRIPTION OF ILLUSTRATIVE EMBODIMENTS

Figure 1:
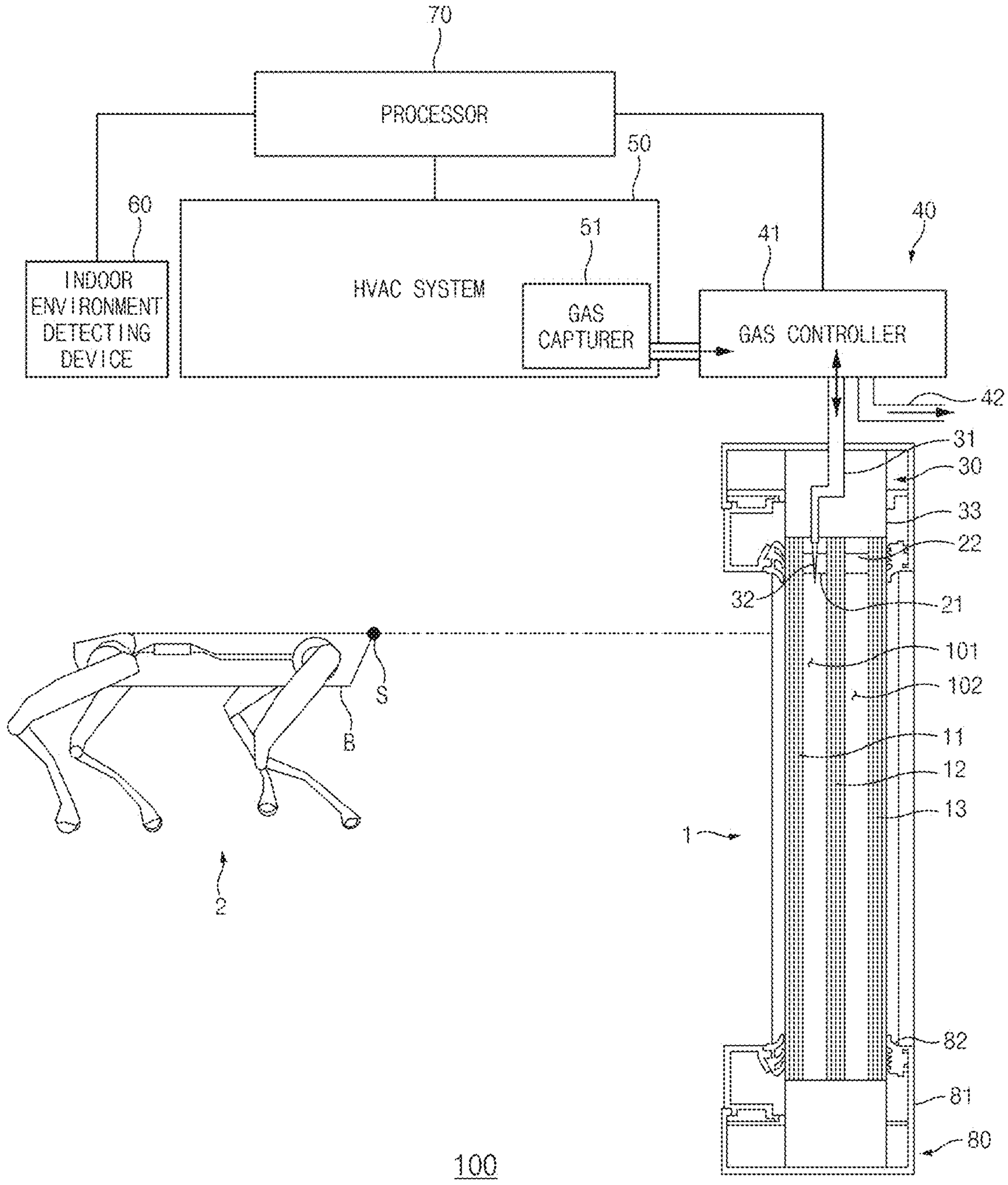
FIG. 1 is a view conceptually showing a window system according to an exemplary embodiment of the present disclosure.

Hereinafter, exemplary embodiments of the present disclosure are described in more detail with reference to the accompanying drawings. When reference numerals are given to elements in each drawing, it should be noted that the same elements are designated by the same reference numerals if possible although they are shown in different drawings. Also, in describing exemplary embodiments of the present disclosure, a detailed description of related known configurations or functions is omitted when it is determined that the understanding of the exemplary embodiments of the present disclosure is hindered by the detailed description.

In describing components of exemplary embodiments of the present disclosure, terms such as first, second, A, B, (a), and (b) may be used. These terms are only used to distinguish one component from other components, and the characteristics, orders, or sequences of the corresponding components are not limited by the terms. When one component is described as being "connected," "coupled," or "linked" to another component, this component may be directly connected or linked to another component, but it should be understood that other components may be "connected," "coupled," or "linked" between these components.

As used herein, the front, rear, left, right, up, and down directions are referred to for convenience of description, and these directions may be determined relative to a direction in which a window 1 is located. The front-rear direction, left-right direction, and up-down direction may be perpendicular to each other. As used herein, an indoor direction and an outdoor direction may be used instead of the front-rear direction.

Figure 2:
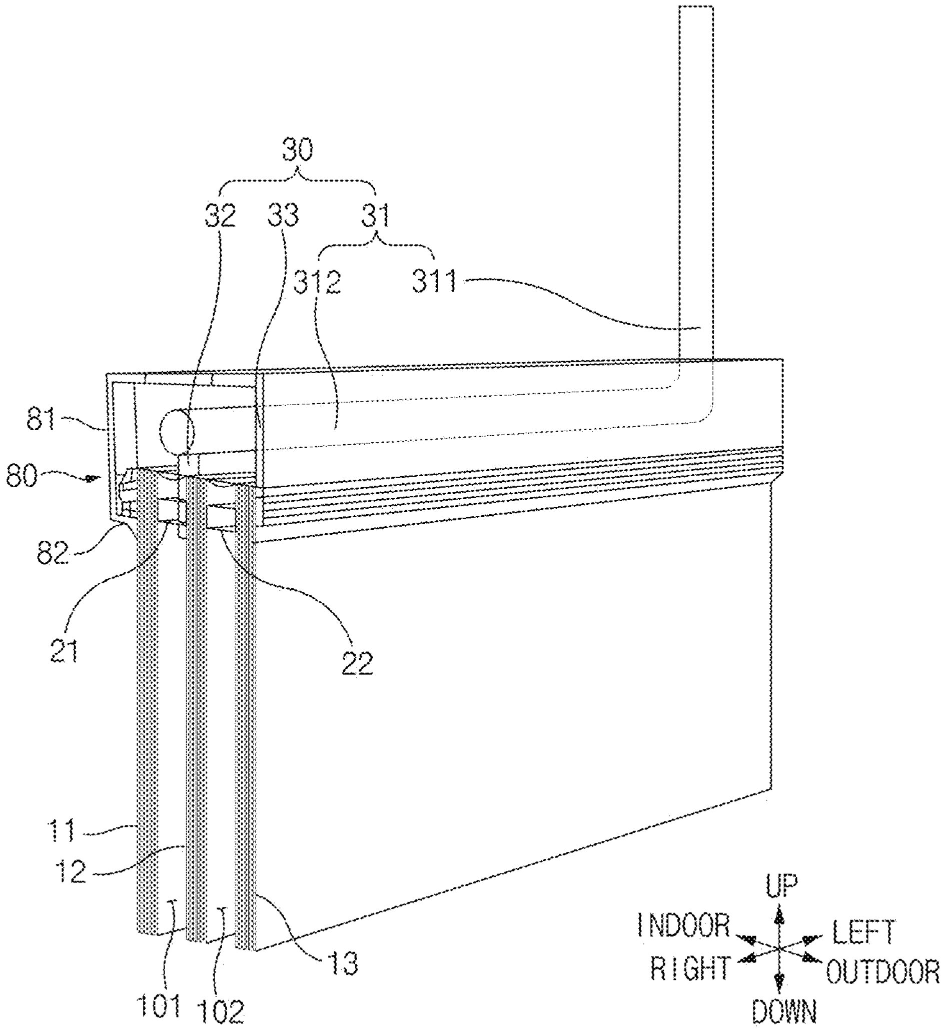
FIG. 2 is a perspective view showing a portion of a window and a cross-section thereof according to an exemplary embodiment of the present disclosure.
Figure 3:
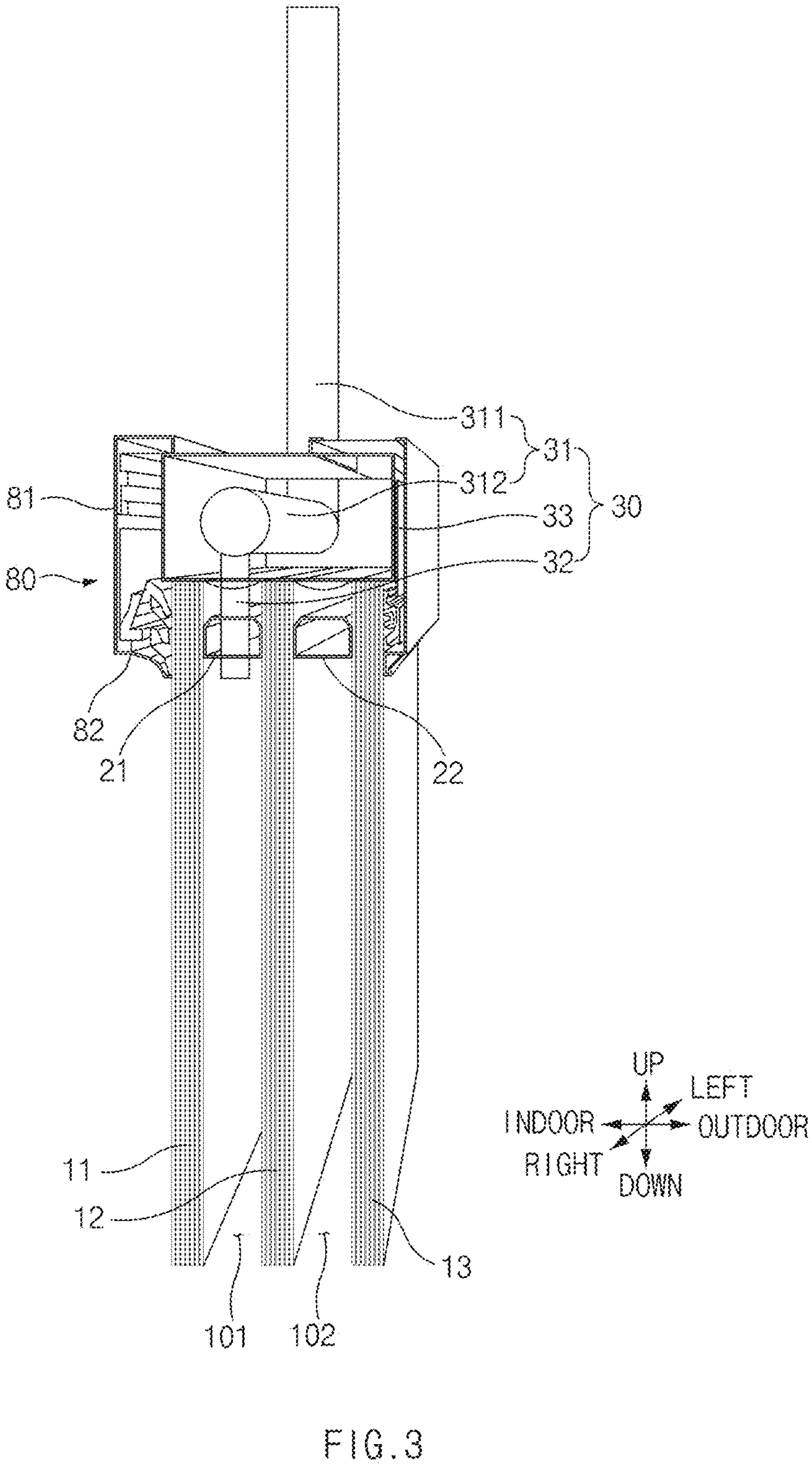
FIG. 3 is a perspective view of the window of FIG. 2 when viewed from another angle.

FIG. 1 is a view conceptually showing a window system 100 according to an exemplary embodiment of the present disclosure. FIG. 2 is a perspective view showing a portion of the window 1 and a cross-section thereof according to an exemplary embodiment of the present disclosure. FIG. 3 is a perspective view of the window 1 of FIG. 2 when viewed from another angle.

Referring to the drawings, the window system 100 according to an exemplary embodiment of the present disclosure may include the window 1 and a robot 2.

The robot 2 includes a movable body B, which may move to perform various tasks, and a robot infrared sensor S, which is an infrared sensor installed on the movable body B. The robot 2 may acquire surrounding information about various distances and temperatures by using the robot infrared sensor S. The robot infrared sensor S provided in the robot 2 may detect infrared light in a specific range. A specific range of infrared light detectable by the robot infrared sensor S may be about 4.2 μm to about 4.4 μm, which is a wavelength range that may be absorbed into and emitted from carbon dioxide. The robot infrared sensor S may be interlocked with a vision device, such as a camera provided in the movable body B.

The window 1 according to an exemplary embodiment of the present disclosure includes transparent plates 11, 12, and 13, a spacer 21, a gas duct 30, and a gas managing unit 40.

The transparent plates 11, 12, and 13 may include a transparent material and may transmit visible light. Here, soda lime-based float glass, polycarbonate, acrylic, fiber reinforced polymer (FRP), etc. may be used as the transparent plates 11, 12, and 13, but the materials thereof are not limited thereto. The transparent plates 11, 12, and 13 may include a first transparent plate 11 and a second transparent plate 12. The transparent plates 11, 12, and 13 may further include a third transparent plate 13, but the number of transparent plates 11, 12, and 13 is not limited thereto. The transparent plates 11, 12, and 13 may be formed in a plate shape perpendicular to the indoor and outdoor directions. The transparent plates 11, 12, and 13 may have a rectangular plate shape that has edges formed in the left-right direction and edges formed in the up-down direction. Through the transparent plates 11, 12, and 13, it is possible to check the outside from the inside and the inside from the outside.

The transparent plates 11, 12, and 13 may be spaced apart from each other in the indoor and outdoor directions. The first transparent plate 11 and the second transparent plate 12 may be spaced apart from each other, and the second transparent plate 12 and the third transparent plate 13 may be spaced apart from each other. The transparent plates 11, 12, and 13 may be arranged in the order of the first transparent plate 11, the second transparent plate 12, and the third transparent plate 13 in a direction from the inside to the outside.

The spacer 21 is disposed between the outer edge portions of the transparent plates 11, 12, and 13 so that the transparent plates 11, 12, and 13 are spaced apart from each other. As illustrated in the drawings, the spacer 21 may be located between the outer edge portion of the first transparent plate 11 and the outer edge portion of the second transparent plate 12 so that the first transparent plate 11 and the second transparent plate 12 are spaced apart from each other. That is, the spacer 21 may be located between the first transparent plate 11 and the second transparent plate 12 in the indoor and outdoor directions. A sub spacer 22 may be further provided between the second transparent plate 12 and the third transparent plate 13.

The spacer 21 may be in contact with the outer edge portion of the first transparent plate 11 and the outer edge portion of the second transparent plate 12. The first transparent plate 11 may be in contact with the indoor side of the spacer 21 and the second transparent plate 12 may be in contact with the outdoor side of the spacer 21. Each of the transparent plates 11, 12, and 13 may have a rectangular shape when viewed in the indoor and outdoor directions, and thus, the spacer 21 may have a rectangular frame shape. That is, the spacer 21 may be formed by coupling a pair of sections extending in the left-right direction and a pair of sections extending in the up-down direction to each other. Each of the extended sections may have a hollow shape, and an outer section may have a tapered shape. The sub spacer 22 may also have the same shape as the spacer 21.

A gas space 101 may be surrounded by the first transparent plate 11, the second transparent plate 12, and the spacer 21. The gas space 101 is a space formed by separating the first transparent plate 11 and the second transparent plate 12 from each other. The gas space 101 is filled with a gas by the gas managing unit 40 and the gas duct 30. The gas filling the gas space 101 may include carbon dioxide. The gas may fill the gas space 101 and serve as a heat insulating layer. In addition, after filling of the carbon dioxide, the infrared light absorbed into and emitted from the carbon dioxide is detected by the robot infrared sensor S. Accordingly, the robot 2 may recognize the window 1. A sub gas space 102 may be surrounded by the second transparent plate 12, the third transparent plate 13, and the sub spacer 22.

The gas duct 30 may allow the gas space 101 to communicate with the outside of the gas space 101. The gas duct 30 may pass through the spacer 21. The gas duct 30 may pass through a profile 80 described below. The inner end of the gas duct 30 may be located in the gas space 101, and the outer end thereof may be connected to the gas managing unit 40. Accordingly, the gas may fill the gas space 101 from the gas managing unit 40 via the gas duct 30. In addition, the gas may be delivered from the gas space 101 to the gas managing unit 40 via the gas duct 30. The sub gas space 102 may also be connected to the gas managing unit 40 via the gas duct 30.

The gas duct 30 may include a duct body 31 through which the gas flows. The duct body 31 may include an extension pall 312 that extends in a direction in which the spacer 21 extends. The extension pall 312 may extend in the left-right direction. The duct body 31 may include an external through-part 311 that passes through the profile 80. The external through-part 311 may extend outward from one end of the extension part 312 in the up-down direction. However, the directions in which the extension part 312 and the external through-part 311 extend are not limited thereto. The extension part 312 may extend in the up-down direction, and the external through-part 311 may extend outward in the left-right direction.

The duct body 31 may include an internal through-part that passes through the spacer 21. However, a nozzle 32 described below may be connected to the end of the extension part 312 without the internal through-part, or the nozzle 32 may be connected to the inner end of the internal through-part.

The gas duct 30 may include the nozzle 32. The nozzle 32 is connected to the end of the duct body 31 to inject the gas flowing in the duct body 31 into the gas space 101. The nozzle 32 may be connected to an end of the extension part 312, which is not the end to which the external through-part 311 is connected, among both ends of the extension part 312, and may pass through the spacer 21.

The gas duct 30 may include a duct space 33 that surrounds the duct body 31 and is surrounded by the profile 80. The duct space 33 may be formed in a hollow pipe shape and located inside the profile 80. The duct body 31 may pass through the duct space 33. The extension part 312 may be located inside the duct space 33.

The profile 80 surrounds the outer edge portion of the first transparent plate 11 and the outer edge portion of the second transparent plate 12. The profile 80 has a section extending in the left-right direction and a section extending in the up-down direction so as to surround each of the transparent plates 11, 12, and 13. These sections may be arranged to surround the transparent plates 11, 12, and 13 when viewed in the indoor and outdoor directions. That is, the profile 80 may serve as a frame of the window 1.

The profile 80 may include a profile body 81 surrounding the gas duct 30 and a packing 82 coupled to the profile body 81 and located between the profile 80 and the transparent plates 11, 12, and 13 to maintain airtightness and watertightness therebetween. The profile body 81 may be made of a material including metal or plastic, and the packing 82 may be made of a material having elasticity such as rubber.

The gas managing unit 40 may deliver the gas to the gas space 101. The gas managing unit 40 is connected to the gas space 101 via the gas duct 30. The gas managing unit 40 may receive the gas that is discharged from the gas space 101 via the gas duct 30. The gas managing unit 40 may be located outside the profile 80. The gas managing unit 40 may include a pump to deliver the gas to the gas space 101 via the gas duct 30. The pump provided in the gas managing unit 40 may discharge the gas from the gas space 101 via the gas duct 30. The pump or the like may be located in a gas managing unit body 41 provided in the gas managing unit 40. The gas managing unit 40 may include a gas discharge pipe 42 connected to the gas managing unit body 41 so that the gas discharged from the gas space 101 is discharged to the outside. The gas managing unit 40 may further include a valve and may control the flow rate or pressure of the injected gas using the pump and the valve.

The gas managing unit body 41 may include a gas injection part that is connected to the gas duct 30 to inject the gas into the gas space 101. The gas managing unit body 41 may include a gas suction part that is connected to the gas duct 30 to suction the gas from the gas space 101. The gas injection part and the gas suction part may be connected to a single gas duct 30, or the gas duct 30 may be provided in plurality and respectively connected to the gas injection part and the gas suction part. When the single gas duct 30 is used, the single gas duct 30 is divided into two branches and respectively connected to the gas suction part and the gas injection part. Also, a three-way valve may be located at a dividing point, or separate valves may be respectively located at the branches.

The gas discharge pipe 42 may be connected to the gas suction part so that the gas suctioned by the gas suction part is discharged to the outside. A filter may be provided in the gas discharge pipe 42 to remove foreign substances or contaminants from the discharged gas. A nozzle may also be located at the end of the gas discharge pipe 42 to discharge the gas to a desired location.

The window 1 may include a concentration measurement unit. The concentration measurement unit may acquire the gas concentration in the gas space 101. The concentration measurement unit may include an infrared sensor for measuring gas concentration, but the types of the concentration measurement unit are not limited thereto. The concentration measurement unit may be located in the gas space 101 and may be coupled to the spacer 21.

The window 1 may include a processor 70. The processor 70 may be electrically connected to each of the components provided in the window 1. The processor 70 may include a central processing unit (CPU) or the like as a component including an element capable of logic operations for performing control commands. The processor 70 is connected to various components of the window 1 according to an exemplary embodiment of the present disclosure. The processor 70 may transmit a signal according to a control command to each of the components and may be connected to various sensors or acquisition units to receive acquired information in the form of a signal. The processor 70 may be electrically connected to each of the components, and thus, the processor 70 may communicate with the components by being connected to the components via wires or by including a communication module capable of wireless communication.

The window 1 further includes a storage medium, and thus, control commands executed by the processor 70 may be stored and utilized in the storage medium. The storage medium may include devices, such as a hard disk drive (HDD), a solid state drive (SSD), a server, a volatile medium, and a nonvolatile medium, but the types of the storage medium are not limited thereto. In addition, data required for the processor 70 to perform tasks may be further stored in the storage medium.

The processor 70 may be set to determine whether to operate the gas managing unit 40 on the basis of the gas concentration acquired by the concentration measurement unit. Specifically, the processor 70 may be set to control the gas managing unit 40 so that the gas concentration acquired by the concentration measurement unit is within an insulating gas concentration range that is a certain gas concentration range. The insulating gas concentration range may refer to a concentration sufficient to maintain the insulating performance and may be, for example, 85% or more.

Also, the processor 70 may be set to control the gas managing unit 40 so that the gas concentration acquired by the concentration measurement unit is within a measurement gas concentration range that is a certain gas concentration range. The measurement gas concentration range may refer to a concentration at which the gas is easily identified by the robot infrared sensor S and may be, for example, 5000 ppm or more.

The window 1 may include a heating, ventilating, and air conditioning (HVAC) system 50. The HVAC system 50 may be located indoors. The HVAC system 50 includes an air conditioning system for controlling indoor air conditions. The HVAC system 50 may perform indoor humidity control, heating, cooling, ventilation, or the like by discharging or suctioning indoor air. To enable these operations to be performed, the HVAC system 50 may include a dehumidifier, an air conditioner, a heater, and the like.

The HVAC system 50 may include a gas capturer 51 which is connected to the gas managing unit 40 to collect and deliver a gas to the gas managing unit 40. The gas capturer 51 may collect a gas from air that is suctioned from a room by the HVAC system 50. The gas capturer 51 may collect the gas from air using at least one of a membrane separation method, an absorption method, or an adsorption method. The gas capturer 51 may include a physical adsorbent for adsorbing a gas and a pressurization and decompression system for separating the gas from the physical adsorbent. The gas capturer 51 may include a cooler for cooling the gas that has passed through the pressurization and decompression system. The gas cooled in the cooler may be liquefied and stored in a gas tank that is described below.

The gas capturer 51 is connected to the gas injection part. The gas collected in the gas capturer 51 is delivered to the gas injection part. The gas injection part may fill the gas space 101 with the gas collected by the gas capturer 51. The gas managing unit 40 may include the gas tank in which the gas is stored. The gas tank includes metal and may be configured to maintain a low temperature and an appropriate pressure. The gas tank may be connected to the gas injection part. The gas injection part may fill the gas space 101 with the gas stored in the gas tank. The gas capturer 51 is connected to the gas tank, and thus, the gas capturer 51 may store the gas in the gas tank. The gas tank may receive a gas from the outside and store the gas therein.

The window 1 may include an indoor environment detecting device 60 (or referred to as an environment detecting device) that is configured to acquire a gas concentration in the surrounding environment. The environment detecting device 60 may include an infrared sensor for measuring gas concentration, but the types of the environment detecting device 60 are not limited thereto. The environment detecting device 60 may be located indoors. The processor 70 may be set to determine whether to operate the gas capturer 51 on the basis of the gas concentration acquired by the environment detecting device 60. Specifically, the processor 70 may be set to control the gas capturer 51 so that the gas concentration acquired by the environment detecting device 60 is within an indoor gas concentration range that is a certain gas concentration range. When it is confirmed that a gas concentration higher than the upper limit of the indoor gas concentration range exists, the gas capturer 51 may be operated to collect the indoor gas to lower the indoor gas concentration. Also, the HVAC system 50 may include a fan for ventilation. Accordingly, when it is confirmed that the gas concentration higher than the upper limit of the indoor gas concentration range exists, the processor 70 may operate a ventilation fan so that the outside air is flowed into the inside and the inside air is discharged to the outside. The indoor gas concentration range may have a range suitable for human habitation and may be, for example, about 350 ppm to about woo ppm.

Accordingly, the window may be easily recognized by the robot.

Even though all the components constituting exemplary embodiments of the present disclosure have been described as being combined as one body or operating in combination, the embodiments of the present disclosure are not necessarily limited to the exemplary embodiments. That is, within the scope of the objectives of embodiments of the present disclosure, all the components may be selectively combined into one or more and then operated. Also, terms such as "include," "constitute," or "have" described above may mean that the corresponding components may be included unless explicitly described to the contrary, and thus should be construed as further including other components rather than excluding other components. Unless otherwise defined, all terms including technical or scientific terms have the same meanings as those generally understood by a person skilled in the art to which the present disclosure pertains. Terms used generally, such as terms defined in dictionaries, should be interpreted as having the same meaning as in an associated technical context, and should not be understood abnormally or as having an excessively formal meaning unless defined apparently in the present disclosure.

The technical ideas of the present disclosure have been described merely for illustrative purposes, and those skilled in the art appreciate that various changes and modifications are possible without departing from the essential features of the present disclosure. Therefore, the exemplary embodiments of the present disclosure are to be considered illustrative and not restrictive, and the technical idea of the present disclosure is not limited to the foregoing embodiments. The protective scope of the present disclosure is defined by the appended claims, and all technical ideas within their equivalents should be interpreted as being included in the scope of the present disclosure.

What is claimed is:

1. A window comprising:

a first transparent plate;

a second transparent plate spaced apart from the first transparent plate;

a spacer located between an outer edge portion of the first transparent plate and an outer edge portion of the second transparent plate to space the first transparent plate and the second transparent plate apart from each other;

a gas duct configured to allow a gas space to communicate with a region outside the window, wherein the gas space is defined by the first transparent plate, the second transparent plate, and the spacer;

a gas capturer configured to collect a gas from a surrounding environment, the gas being a component of the surrounding environment; and a gas managing device connected to the gas capturer to receive the collected gas, the gas managing device comprising:

a gas injection part connected to the gas duct and located to inject the gas collected by the gas capturer into the gas space;

a concentration measurement device configured to acquire a gas concentration in the gas space; and a processor electrically connected to the concentration measurement device and the gas managing device, wherein the processor is configured to determine whether to operate the gas managing device based on the gas concentration acquired by the concentration measurement device and to control the gas concentration to be within a certain gas concentration range.

2. The window of claim 1, wherein the gas managing device further comprises:

a gas suction part connected to the gas duct and configured to suction the gas from the gas space; and a gas discharge pipe connected to the gas suction part and configured to discharge the gas suctioned by the gas suction part to the region outside the window.

3. The window of claim 1, wherein the gas duct passes through the spacer.

4. The window of claim 3, wherein the gas duct comprises an extension part extending in a direction in which the spacer extends.

5. The window of claim 1, further comprising a profile surrounding the outer edge portion of the first transparent plate and the outer edge portion of the second transparent plate, wherein the gas managing device is located outside the profile and the gas duct passes through the profile.

6. The window of claim 1, wherein the gas duct comprises:

a duct body configured to allow the gas to flow; and a nozzle connected to an end of the duct body to inject the gas flowing in the duct body into the gas space.

7. The window of claim 1, further comprising:

an environment detecting device configured to acquire a gas concentration in a surrounding environment; and wherein the processor is electrically connected to the environment detecting device and the gas capturer, the processor further configured to determine whether to operate the gas capturer based on the gas concentration acquired by the environment detecting device.

8. The window of claim 1, wherein the gas injected into the gas space by the gas managing device comprises carbon dioxide.

9. A window system comprising:

a robot comprising a robot infrared sensor; and a window comprising:

a pair of transparent plates including a first transparent plate and a second transparent plate that is spaced from the first transparent plate;

a spacer located between an outer edge portion of the first transparent plate and an outer edge portion of the second transparent plate to space the first transparent plate and the second transparent plate apart from each other;

a gas duct configured to allow a gas space to communicate with a region outside the window, wherein the gas space is defined by the first transparent plate, the second transparent plate, and the spacer;

a gas capturer configured to collect a gas from a surrounding environment, the gas being a component of the surrounding environment that is detectable by the robot infrared sensor; and a gas managing device connected to the gas capturer and the gas duct to inject the gas collected by the gas capturer into the gas space wherein the gas managing device comprises:

a gas injection part connected to the gas duct and located to inject the gas into the gas space;

a concentration measurement device configured to acquire a gas concentration in the gas space; and a processor electrically connected to the concentration measurement device and the gas managing device, wherein the processor is configured to determine whether to operate the gas managing device based on the gas concentration acquired by the concentration measurement device and to control the gas concentration to be within a certain gas concentration range.

10. The window system of claim 9, wherein the gas managing device further comprises:

a gas suction part connected to the gas duct and configured to suction the gas from the gas space; and a gas discharge pipe connected to the gas suction part and configured to discharge the gas suctioned by the gas suction part to the region outside the window.

11. The window system of claim 9, wherein the gas duct passes through the spacer.

12. The window system of claim 11, wherein the gas duct comprises an extension part extending in a direction in which the spacer extends.

13. The window system of claim 9, further comprising a profile surrounding the outer edge portions of the first and second transparent plates, wherein the gas managing device is located outside the profile and the gas duct passes through the profile.

14. The window system of claim 9, wherein the gas duct comprises:

a duct body configured to allow the gas to flow; and a nozzle connected to an end of the duct body to inject the gas flowing in the duct body into the gas space.

15. A window comprising:

a first transparent plate;

a second transparent plate spaced apart from the first transparent plate;

a spacer located between an outer edge portion of the first transparent plate and an outer edge portion of the second transparent plate to space the first transparent plate and the second transparent plate apart from each other;

a gas duct configured to allow a gas space to communicate with a region outside the window, wherein the gas space is defined by the first transparent plate, the second transparent plate, and the spacer;

a gas capturer configured to collect and acquire carbon dioxide from surrounding air using a membrane separation method, an absorption method, or an adsorption method; and a gas managing device connected to the gas capturer to receive the carbon dioxide, the gas managing device comprising:

a gas injection part connected to the gas duct and located to inject the collected carbon dioxide into the gas space;

a concentration measurement device configured to acquire a gas concentration of the carbon dioxide in the gas space; and a processor electrically connected to the concentration measurement device and the gas managing device, wherein the processor is configured to determine whether to operate the gas managing device based on the gas concentration acquired by the concentration measurement device and to control the gas concentration to be within a certain gas concentration range.

16. The window of claim 15, further comprising:

a gas suction part connected to the gas duct and configured to suction the gas from the gas space; and a gas discharge pipe connected to the gas suction part and configured to discharge the gas suctioned by the gas suction part to the region outside the window.

17. The window of claim 15, wherein the gas duct passes through the spacer.

18. The window of claim 15, further comprising a profile surrounding the outer edge portion of the first transparent plate and the outer edge portion of the second transparent plate, wherein the gas managing device is located outside the profile and the gas duct passes through the profile.

19. The window of claim 15, wherein the gas duct comprises:

a duct body configured to allow the gas to flow; and a nozzle connected to an end of the duct body to inject the gas flowing in the duct body into the gas space.

20. The window of claim 15, further comprising an environment detecting device configured to acquire a gas concentration in a surrounding environment, wherein the processor is electrically connected to the environment detecting device and the gas capturer, the processor further configured to determine whether to operate the gas capturer based on the gas concentration acquired by the environment detecting device.

* * * * *